(12) United States Patent
Tanaka et al.

(10) Patent No.: US 10,947,936 B2
(45) Date of Patent: Mar. 16, 2021

(54) SIDE-BY-SIDE VEHICLE HAVING AIR-INTAKE UNIT FACING CARGO CARRIER

(71) Applicant: KAWASAKI JUKOGYO KABUSHIKI KAISHA, Kobe (JP)

(72) Inventors: Shinichi Tanaka, Kobe (JP); Ayumi Hamada, Kakogawa (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 226 days.

(21) Appl. No.: 16/132,168

(22) Filed: Sep. 14, 2018

(65) Prior Publication Data

US 2020/0088142 A1 Mar. 19, 2020

(51) Int. Cl.
| | | |
|---|---|---|
| *B60K 11/02* | (2006.01) | |
| *F02M 35/10* | (2006.01) | |
| *F02M 35/16* | (2006.01) | |
| *B62K 11/02* | (2006.01) | |
| *B60K 13/02* | (2006.01) | |

(52) U.S. Cl.
CPC ....... *F02M 35/10078* (2013.01); *B60K 13/02* (2013.01); *B62K 11/02* (2013.01); *F02M 35/10288* (2013.01); *F02M 35/161* (2013.01); *B60Y 2200/124* (2013.01); *B60Y 2200/20* (2013.01); *B60Y 2400/72* (2013.01)

(58) Field of Classification Search
CPC ...... B60K 11/00; B60K 13/02; F02M 35/161; F02M 35/10288
See application file for complete search history.

(56) References Cited

U.S. PATENT DOCUMENTS

| | | | |
|---|---|---|---|
| 8,613,336 B2 | 12/2013 | Deckard et al. | |
| 2008/0168960 A1* | 7/2008 | Chen | F02M 35/10072 |
| | | | 123/184.21 |
| 2015/0061275 A1* | 3/2015 | Deckard | B60K 17/22 |
| | | | 280/788 |

\* cited by examiner

*Primary Examiner* — John D Walters
*Assistant Examiner* — James J Triggs
(74) *Attorney, Agent, or Firm* — Alleman Hall Creasman & Tuttle LLP

(57) ABSTRACT

A side-by-side vehicle comprises a vehicle body frame including a cabin frame part surrounding a riding space in which seats for a driver and a passenger are provided; an engine which is mounted on the vehicle body frame and generates driving power for allowing the side-by-side vehicle to travel; an air-intake unit including in an inside thereof, an air-intake passage through which intake-air flows to the engine, and an air inlet through which the intake-air is introduced into the air-intake passage; and a cargo carrier having a loading space with a depressed shape in a state in which the cargo carrier is supported by the vehicle body frame, and the air-intake unit is disposed so that the air inlet is directed downward and faces a surface of the cargo carrier.

19 Claims, 12 Drawing Sheets

SIDE-BY-SIDE VEHICLE HAVING AIR-INTAKE UNIT FACING CARGO CARRIER

BACKGROUND OF THE INVENTION

Field of the Invention

The present invention relates to a side-by-side vehicle including an air-intake structure for flowing air (intake-air) taken in from outside to an engine mounted in the vehicle.

Description of the Related Art

For example, U.S. Pat. No. 8,613,336 discloses a side-by-side vehicle of a four-wheel-drive type which is able to travel off-road. This vehicle includes an air-intake structure for flowing air (intake air) taken in from outside to an engine mounted in the vehicle. This air-intake structure includes, for example, an air-intake passage, and an air inlet disposed at the outer side surface of a vehicle body to introduce the air into the air-intake passage.

In the side-by-side vehicle including the above-described air-intake structure, there is a possibility that foreign matters such as mud, water, or sand enter the air-intake passage through the air inlet and reach the engine or the like, while the vehicle is traveling off-road (e.g., vehicle is traveling on an unpaved road).

SUMMARY OF THE INVENTION

In view of the above-described circumstances, an object of the present invention is to prevent ingress of foreign matters into an air-intake passage through an air inlet, in a side-by-side vehicle including an air-intake structure for flowing air (intake-air) taken in from outside to an engine mounted in the vehicle.

According to an aspect of the present invention, a side-by-side vehicle comprises a vehicle body frame including a cabin frame part surrounding a riding space in which seats for a driver and a passenger are provided; an engine which is mounted on the vehicle body frame and generates driving power for allowing the side-by-side vehicle to travel; an air-intake unit including in an inside thereof, an air-intake passage through which intake-air flows to the engine, and an air inlet through which the intake-air is introduced into the air-intake passage; and a cargo carrier having a loading space with a depressed shape in a state in which the cargo carrier is supported by the vehicle body frame, and the air-intake unit is disposed so that the air inlet is directed downward and faces a surface of the cargo carrier.

In accordance with this configuration, since the air inlet through which the intake-air is introduced into the air-intake passage of the air-intake unit is disposed to face the surface of the cargo carrier, the air inlet is protected by the surface of the cargo carrier. Therefore, even in a case where the vehicle is traveling off road (e.g., vehicle is traveling on an unpaved road), ingress of foreign matters into the air-intake passage through the air inlet can be effectively prevented.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, the embodiments of the present invention will be described with reference to the drawings. The stated directions are from the perspective of a driver or passenger riding in a side-by-side vehicle.

Embodiment 1

Figure 1:
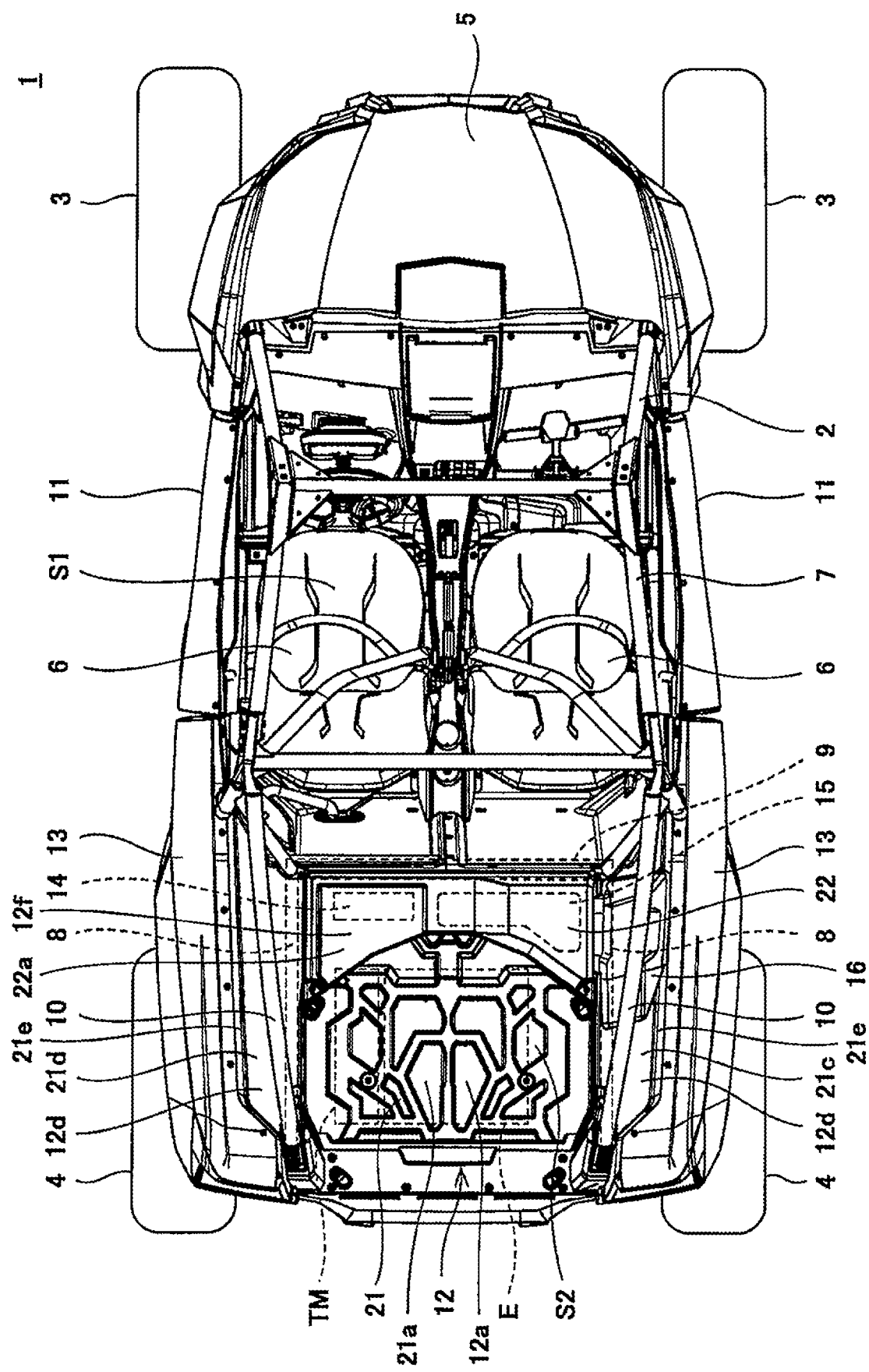
FIG. 1 is a top plan view showing a side-by-side vehicle (vehicle) according to Embodiment 1, when viewed from above.
Figure 2:
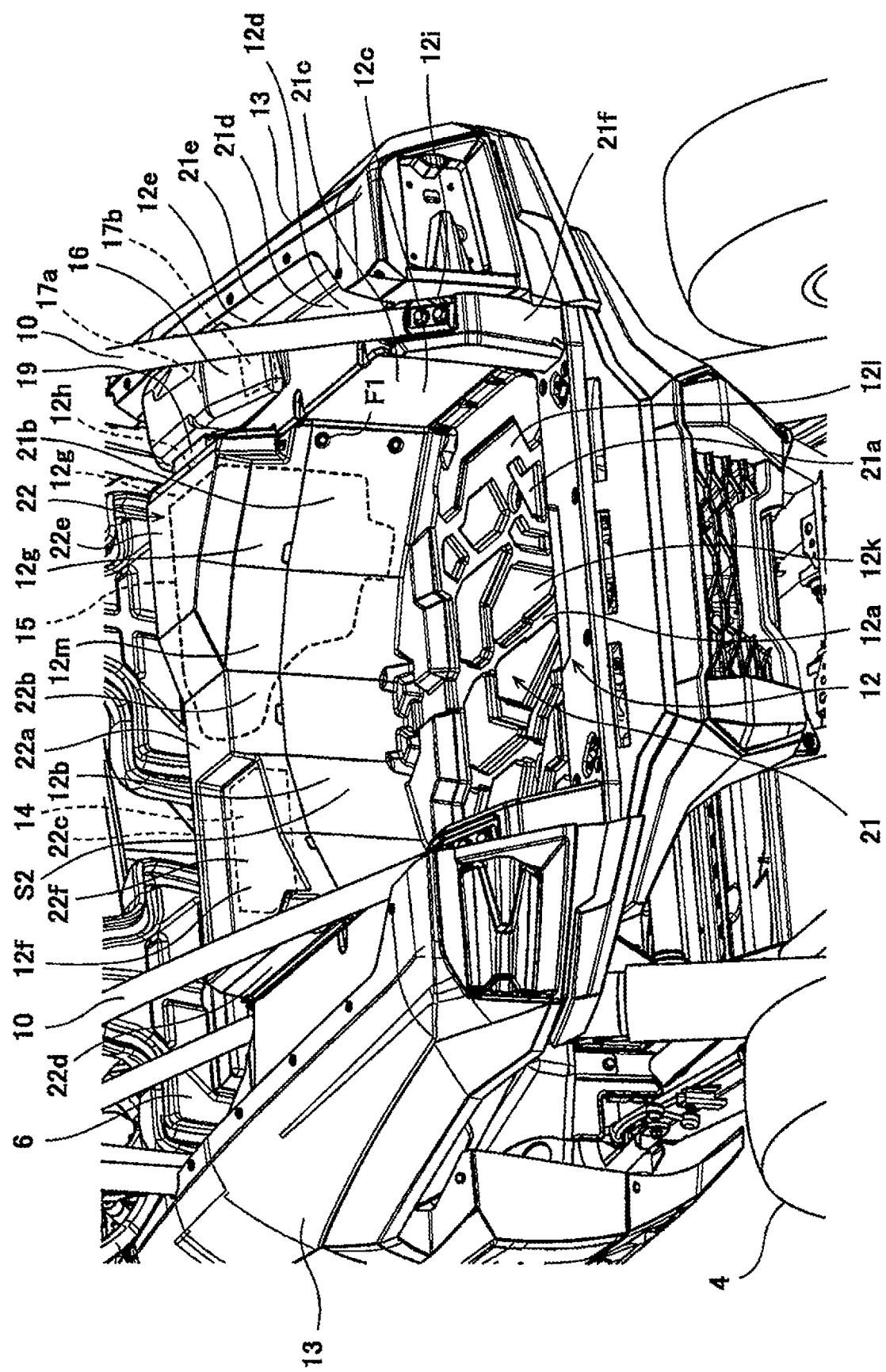
FIG. 2 is a perspective view showing a cargo carrier of FIG. 1.

FIG. 1 is a top plan view showing a side-by-side 1 (hereinafter will be simply referred to as a vehicle 1) according to Embodiment 1, when viewed from above. FIG. 2 is a perspective view showing a cargo carrier 12 of FIG. 1.

Referring to FIGS. 1 and 2, the vehicle 1 includes a pair of right and left front wheels 3 supported by the front portion of a vehicle body frame 2, a pair of right and left rear wheels 4 supported by the rear portion of the vehicle body frame 2, an engine (driving power unit) E which generates driving power for allowing the vehicle 1 to travel, a continuously variable transmission (CVT) TM connected to the engine E, the cargo carrier 12, an air cleaner box 15, and an air-intake unit 16.

A space formed between the right and left front wheels 3 is covered by a hood 5 from above. A pair of seats 6 (a driver seat and a passenger seat) are arranged side by side, at a location that is rearward of the hood 5, and is in the vicinity of the center of the vehicle body frame 2 in the forward and rearward direction. The engine E is disposed rearward of the seats 6 and supported by (mounted on) the vehicle body frame 2. The CVT TM is disposed at a location that is adjacent to the engine E. The CVT TM is supported by the vehicle body frame 2 with the engine E placed between the CVT TM and the vehicle body frame 2.

The vehicle body frame 2 includes, for example, a cabin frame part 7, a pair of right and left rear frame parts 8, a cross frame part 9, and a pair of right and left rear gusset frame parts 10. The vehicle body frame 2 is a pipe frame including a plurality of pipe members which are coupled to each other. The cabin frame part 7 is disposed to surround a riding space S1 in which the seats 6 are provided. The pair of right and left rear frame parts 8 are disposed on both sides (right and left sides), respectively, in a vehicle width direction at a location that is rearward of the cabin frame part 7 and extend rearward.

The cross frame part 9 is disposed rearward of the cabin frame part 7 and connects the front end portions of the pair of right and left rear frame parts 8 to each other. The pair of right and left rear gusset frame parts 10 couple the upper portions of the cabin frame part 7 to the rear portions of the pair of right and left rear frame parts 8, respectively.

Doors 11 are disposed on both sides (right and left sides) of the seats 6, respectively, to allow the driver and the passenger to get into and out of the vehicle 1. A pair of right and left rear fenders 13 are disposed on both sides (right and left sides) in the vehicle width direction, respectively, at a location that is rearward of the seats 6 and above the rear wheels 4 in a state in which the rear fenders 13 are supported by (mounted on) the vehicle body frame 2. The front ends of the rear fenders 13 are close to and face the rear ends of the doors 11, respectively. The outer side surfaces in the vehicle width direction, of the rear fenders 13 are coplanar with the outer side surfaces in the vehicle width direction, of the doors 11, respectively.

The air-intake unit 16 includes in an inside thereof an air-intake passage 17a through which the air (intake-air) taken in from outside flows to the engine E mounted in the vehicle 1, and an air inlet 17b through which the intake-air is introduced into the air-intake passage 17a. The air-intake unit 16 is disposed on a first side (right side in the present embodiment) in the vehicle width direction of the vehicle 1 (the air-intake unit 16 is disposed at the cargo carrier 12 at a location that is on the first side in the vehicle width direction). The air-intake unit 16 is exposed. The air-intake unit 16 is connected to the air cleaner box 15 via a connection member 19. In the present embodiment, the air-intake unit 16 is located outward of the air cleaner box 15 in the vehicle width direction.

The air cleaner box 15 is configured to filter the intake-air flowing from the air-intake passage 17a (the intake-air which has passed through the air-intake passage 17a) of the air-intake unit 16 and supply the filtered to the engine E, in a state in which the air cleaner box 15 is supported by (mounted on) the vehicle body frame 2. In the vehicle 1, the cargo carrier 12 and the air cleaner box 15 are disposed rearward of the riding space S1.

The cargo carrier 12 has a loading space S2 with a depressed (recessed) shape which opens in an upward direction, in a state in which the cargo carrier 12 is supported by the vehicle body frame 2. The cargo carrier 12 is fastened to the vehicle body frame 2 directly or via brackets, by use of a plurality of fastening members F1 (e.g., bolts and rivets).

The cargo carrier 12 includes a main carrier part 21, and a front carrier part 22. The main carrier part 21 includes a bottom wall portion 21a, a front wall portion 21b, a pair of right and left side wall portions 21c, a pair of right and left shoulder wall portions 21d, a pair of right and left extension portions 21e, and a pair of right and left rear wall portions 21f.

The bottom wall portion 21a includes a bottom surface 12a of the loading space S2. The bottom wall portion 21a covers the engine E and the CVT TM from above. The bottom surface 12a has a concave/convex structure including a depressed region 121, and a plurality of convex portions 12k protruding upward from the depressed region 121, and arranged apart from each other. The bottom surface 12a is formed with a drain hole (not shown) through which liquid accumulated in the bottom surface 12a is discharged from the loading space S2. Alternatively, the drain hole may be omitted.

The front wall portion 21b protrudes upward from the front end of the bottom surface 12a. When viewed from above (in a plan view), the front wall portion 21b has a shape in which it protrudes forward, as a whole. The front wall portion 21b includes a front surface 12b extending in the vehicle width direction and having a substantially circular-arc shape which protrudes forward when viewed from above. The both ends of the front surface 12b in the vehicle width direction are connected to the front ends of the side surfaces 12c of the pair of right and left side wall portions 21c, respectively.

A battery 14 which is an electric power supply for in-vehicle devices, and the air cleaner box 15 are disposed in front of the front wall portion 21b. The battery 14 and the air cleaner box 15 are arranged side by side in the vehicle width direction. The pair of right and left side wall portions 21c have the side surfaces 12c, respectively, protruding upward from the side ends of the bottom surface 12a. In the vehicle 1, the loading space S2 is surrounded and defined by the bottom surface 12a, the front surface 12b, and the pair of right and left side surfaces 12c of the cargo carrier 12. The loading space S2 opens in an upward direction and in a rearward direction.

Each of the pair of right and left shoulder wall portions 21d includes a shoulder surface 12d protruding outward in the vehicle width direction from the upper end of the side surface 12c of corresponding one of the side wall portions 21c. The right shoulder wall portion 21d is provided with an air-intake unit fastening section 12j (see FIG. 5) which will be described later.

Each of the pair of right and left extension portions 21e includes an extension surface 12e extending from the outer side of the shoulder surface 12d in the vehicle width direction toward the upper end of corresponding one of the rear fenders 13. The upper end of each of the extension portions 21e is connected to corresponding one of the rear fenders 13. In this structure, in the vehicle 1, the cargo carrier 12 is connected to the pair of right and left rear fenders 13 in a state in which the surface of the cargo carrier 12 is continuous with the surfaces of the rear fenders 13. Each of the right and left rear wall portions 21f is connected to the rear end of corresponding one of the side wall portions 21c and the rear end of corresponding one of the shoulder wall portions 21d.

The front carrier part 22 covers the battery 14 and the air cleaner box 15, from above. The front carrier part 22 includes an upper wall portion 22a, a rear wall portion 22b, a front wall portion 22c, and a pair of right and left side wall portions 22d. When viewed from above (in a plan view), the front carrier part 22 extends in the vehicle width direction, on the front side of the main carrier part 21, from a location corresponding to the left end of the bottom wall portion 21a to a location corresponding to the right end of the bottom wall portion 21a.

The upper wall portion 22a of the front carrier part 22 includes an upper surface 12f disposed above the air cleaner box 15 at a location that is higher than the bottom surface 12a. The upper end of the air cleaner box 15 is higher than the upper end of the battery 14. In this structure, the upper wall portion 22a has a shape in which a region (right section 22e) of the upper wall portion 22a which is right (just) above the air cleaner box 15 is higher than a region (left section 22f) of the upper wall portion 22a which is right (just) above the battery 14.

The rear wall portion 22b of the front carrier part 22 protrudes downward from the rear end of the upper wall portion 22a. When viewed from above (in a plan view), the rear wall portion 22b has a shape in which it protrudes forward, as a whole. More specifically, the rear wall portion 22b includes a front surface 12m extending in the vehicle width direction and having a substantially circular-arc shape in which the front surface 22m protrudes forward when viewed from above. The lower end of the front surface 12m is connected to the upper end of the front surface 12b of the front wall portion 21b. In this structure, the rear wall portion 22b of the front carrier part 22 and the front wall portion 21b of the main carrier part 21 define the front surface of the loading space S2.

The front wall portion 22c of the front carrier part 22 protrudes downward from the front end of the upper wall portion 22a. The pair of right and left side wall portions 22d protrude downward from the right end and left end, respectively, of the upper wall portion 22a, and are connected to the rear wall portion 22b and the front wall portion 22c.

The side wall portion 22d of the front carrier part 22, which is located closer to the air-intake unit 16, includes a side surface 12g located in a portion of the upper surface 12f which is closer to the air-intake unit 16. The side surface 12g is formed with a through-hole 12h. The air-intake unit 16 is connected to the air cleaner box 15 via the through-hole 12h.

As shown in FIG. 2, each of the pair of right and left shoulder wall portions 21d extends in the forward and rearward direction from a location corresponding to the front end of the front carrier part 22 to a location corresponding to the rear end of the cargo carrier 12. In this configuration, the shoulder surface 12d extends through a gap formed between the side surface 12g of the front carrier part 22 and the extension surface 12e of the main carrier part 21, and the air-intake unit 16 is disposed to overlap with the shoulder surface 12d in this gap.

The front carrier part 22 is disposed so that the upper part of the air cleaner box 15 can be exposed. In the present embodiment, the front carrier part 22 is removably (detachably) fastened to the main carrier part 21 by fastening members such as rivets. By removing the fastening members, the front carrier part 22 can be dismounted (detached) from the main carrier part 21 (see FIG. 7), and the upper side of the air cleaner box 15 is exposed.

The cargo carrier 12 is fastened to the pair of right and left rear frame parts 8 in a state in which the cargo carrier 12 covers the rear frame parts 8 from above. Openings 12i are formed on both sides in the vehicle width direction, of the rear portion of the cargo carrier 12, to expose the rear portions of the rear frame parts 8, respectively. The rear portions of the pair of right and left rear gusset frame parts 10 are fastened to the rear portions of the pair of right and left rear frame parts 8, via the openings 12i, respectively, of the cargo carrier 12.

Figure 3:
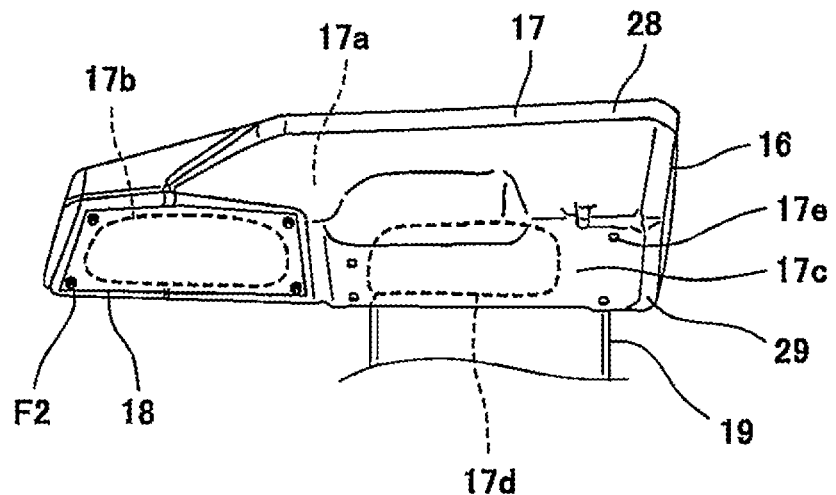
FIG. 3 is a perspective view showing an air-intake unit of FIG. 1, when viewed from the right and below.

FIG. 3 is a perspective view of the air-intake unit 16 of FIG. 1, when viewed from the right and below. As shown in FIG. 3, the air-intake unit 16 includes a hollow member 17, and a first filter member 18 (filter member of the air-intake unit 16). The hollow member 17 includes a first case 28 and a second case 29 which are vertically joined to each other. The first case 28 is located on an upper side, while the second case 29 is located on a lower side. For example, the hollow member 17 has an elongated shape in which a maximum (largest) thickness (height) is smaller than a maximum (largest) width, and is disposed in such a manner that its lengthwise direction corresponds with the forward and rearward direction. For example, a highest position of the upper surface of the hollow member 17 is lower than a highest position of the cargo carrier 12.

The air inlet 17b of the air-intake unit 16 is directed downward and faces the surface (the right shoulder surface 12d in Embodiment 1) of the cargo carrier 12. The air inlet 17b is provided at the lower side of the rear portion of the hollow member 17. The air inlet 17b is covered by the first filter member 18. The first filter member 18 is formed of, for example, a mesh sheet. The first filter member 18 is removably fastened to a peripheral region of the air inlet 17b of the hollow member 17 by fastening members F2 (e.g., rivets or the like).

A mounting surface 17c is provided at the lower side of the front portion of the hollow member 17 and used to mount the air-intake unit 16 on the right shoulder surface 12d of the cargo carrier 12. The mounting surface 17c is formed with a plurality of insertion holes 17e into which fastening members F3 (see FIG. 5) are insertable. The mounting surface 17c is in surface contact with the shoulder surface 12d of the cargo carrier 12.

A connection hole 17d is formed in a side surface (left side surface in Embodiment 1) of the hollow member 17 which is closer to the air cleaner box 15. The connection member 19 is connected to the connection hole 17d. The periphery of the connection hole 17d is continuous in a state in which the first case 28 and the second case 29 are joined to each other. The connection hole 17d is disposed in front of the air inlet 17b.

Figure 4:
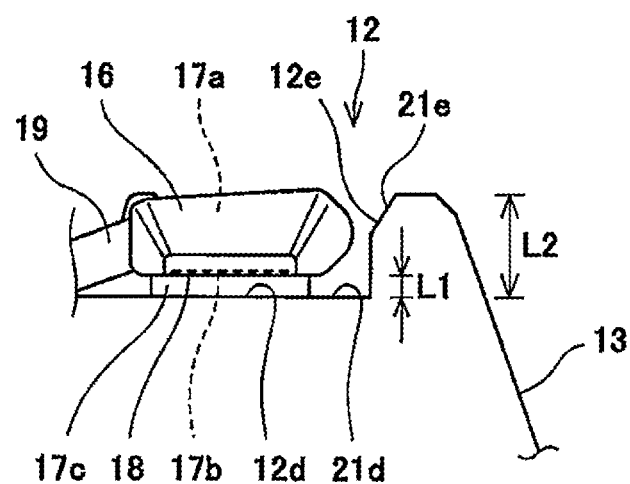
FIG. 4 is a view showing an air-intake unit and the right side portion of the cargo carrier of FIG. 1, when viewed from the rear.

FIG. 4 is a view showing the air-intake unit 16 and the right side portion of the cargo carrier 12 of FIG. 1 when viewed from the rear. FIG. 4 shows the contour of the right shoulder wall portion 21d and the contour of the right extension surface 12e, of the cargo carrier 12. As shown in FIG. 4, a minimum (shortest) distance L1 between the shoulder surface 12d of the shoulder wall portion 21d and the air inlet 17b of the air-intake unit 16 is shorter than a minimum (shortest) distance L2 between the shoulder surface 12d of the shoulder wall portion 21d and the upper end surface of the rear fender 13. A vertical position (position in a height direction) of the air inlet 17b is lower than a vertical position (position in a height direction) of the uppermost end of the rear fender 13. In this structure, the rear fender 13 functions as a barrier to prevent a situation in which foreign matters present in an outside region of the rear fender 13 move beyond the rear fender 13 and are suctioned into the air-intake passage 17a through the air inlet 17b.

The minimum (shortest) distance L1 can be suitably set. However, preferably, the minimum distance L1 is set to a value so that the air inlet 17b of the air-intake unit 16 is positioned apart at a certain distance from the shoulder surface 12d, in order to make it difficult for foreign matters present on the shoulder surface 12d to be suctioned into the air-intake passage 17a through the air inlet 17b. In the present embodiment, the mounting surface 17c protrudes downward more than the peripheral region of the air inlet 17b. With this shape, in a state in which the mounting surface 17c is in surface contact with the shoulder surface 12d, the air inlet 17b is apart at the minimum distance L1 from the shoulder surface 12d.

Although the lower region of the hollow member 17 including the periphery of the air inlet 17b is parallel to the shoulder surface 12d, for example, the lower region of the hollow member 17 may be inclined with respect to the shoulder surface 12d. The shape of the first filter member 18 is not limited to a sheet, and may be a three-dimensional shape. In this case, for example, a portion of the first filter member 18 may be exposed through the air inlet 17b, and the remaining portion of the first filter member 18 may be located inside the air-intake passage 17a. In this case, for example, the first filter member 18 may be formed of a porous material such as sponge. Further, the first filter member 18 with a sheet shape may be disposed to cover the air inlet 17b, and a filter member separate from the first filter member 18 may be disposed inside the air-intake passage 17a.

Figure 5:
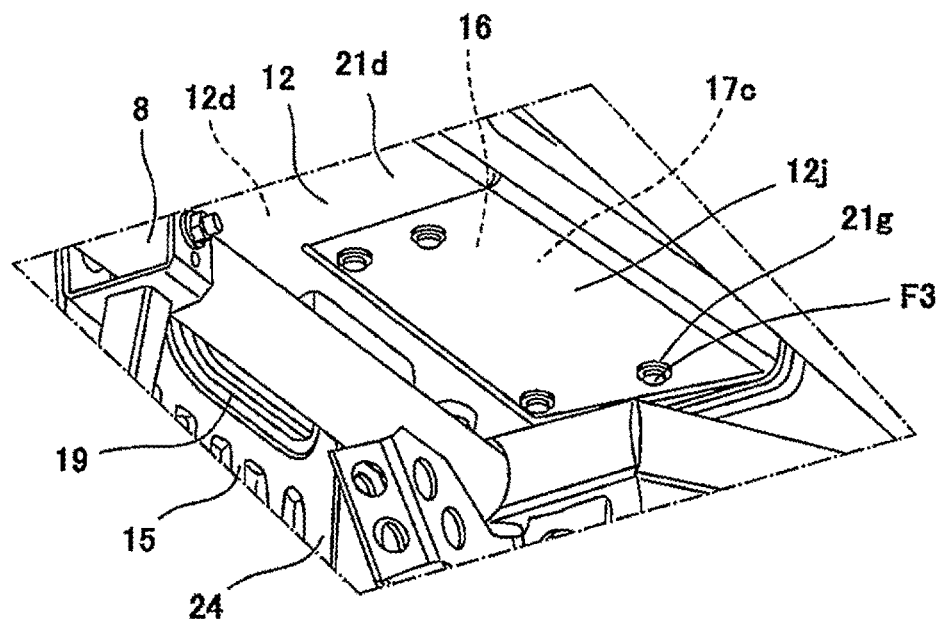
FIG. 5 is a perspective view showing an air-intake unit fastening section of the cargo carrier of FIG. 1.

FIG. 5 is a perspective view showing the air-intake unit fastening section 12j of the cargo carrier 12 of FIG. 1. FIG. 5 shows a state in which the shoulder wall portion 21d is viewed through a region below the rear fender 13, from the right and the rear of the vehicle 1. As shown in FIG. 5, the air-intake unit 16 is removably (detachably) fastened to the shoulder wall portion 21d of the cargo carrier 12 by use of fastening members F3 (e.g., rivets) inserted into a plurality of insertion holes 21g, respectively, formed in the shoulder wall portion 21d, in a state in which the mounting surface 17c is lapped on the shoulder surface 12d.

During maintenance or the like for the air-intake unit 16, the air-intake unit 16 can be easily detached from the shoulder wall portion 21d, by removing the fastening members F3 through the region below the rear fender 13. Also, the air-intake unit 16 is reversed (inverted), and the fastening members F2 are removed from the peripheral region of the air inlet 17b. In this way, the first filter member 18 can be easily detached (dismounted) from the hollow member 17.

Figure 6:
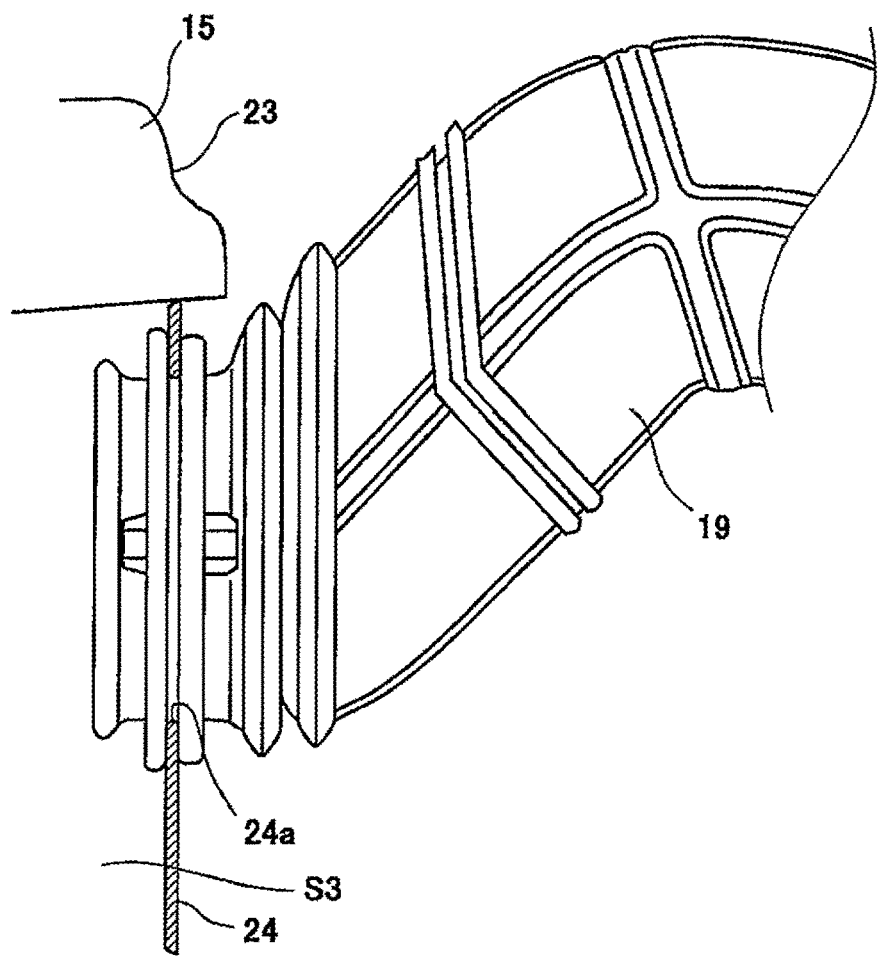
FIG. 6 is a view showing a connection member of FIG. 2, when viewed from a forward and rearward direction.

FIG. 6 is a view showing the connection member 19 of FIG. 2, when viewed from the forward and rearward direction. FIG. 6 shows a vertical section of the lower case 24 of the air cleaner box 15. As shown in FIG. 6, the air cleaner box 15 includes an upper case 23 and the lower case 24 which are joined to each other in a substantially vertical direction. The air cleaner box 15 has an inner space S3 defined by the upper case 23 and the lower case 24. An air-intake port 24a is formed in the side surface of the lower case 24 which is closer to the air-intake unit 16, to introduce the intake-air flowing from the connection member 19 (the intake-air which has flowed through the connection member 19) into the inner space S3 of the air cleaner box 15.

The connection member 19 is a tubular member and extends in the vehicle width direction. A part of the side portion of the connection member 19, which is closer to the air cleaner box 15, has a bellows-like shape. A first end of the connection member 19 is connected to the connection hole 17d of the air-intake unit 16. A second end of the connection member 19 is connected to the air-intake port 24a of the lower case 24 of the air cleaner box 15. For example, the connection member 19 is inclined upward (extends with an upward slope) from the air-intake unit 16 toward the air cleaner box 15 and then is inclined downward (extends with a downward slope). The connection member 19 has a passage with a cross-section in which a dimension in the forward and rearward direction is larger than a vertical dimension.

By separating the first case 28 and the second case 29 of the hollow member 17 from each other, the connection member 19 can be detached from the hollow member 17. In the above-described configuration, the air-intake unit 16 is detachably connected to the air cleaner box 15 so that the air-intake passage 17a is in communication with the inner space S3 of the air cleaner box 15.

Figure 7:
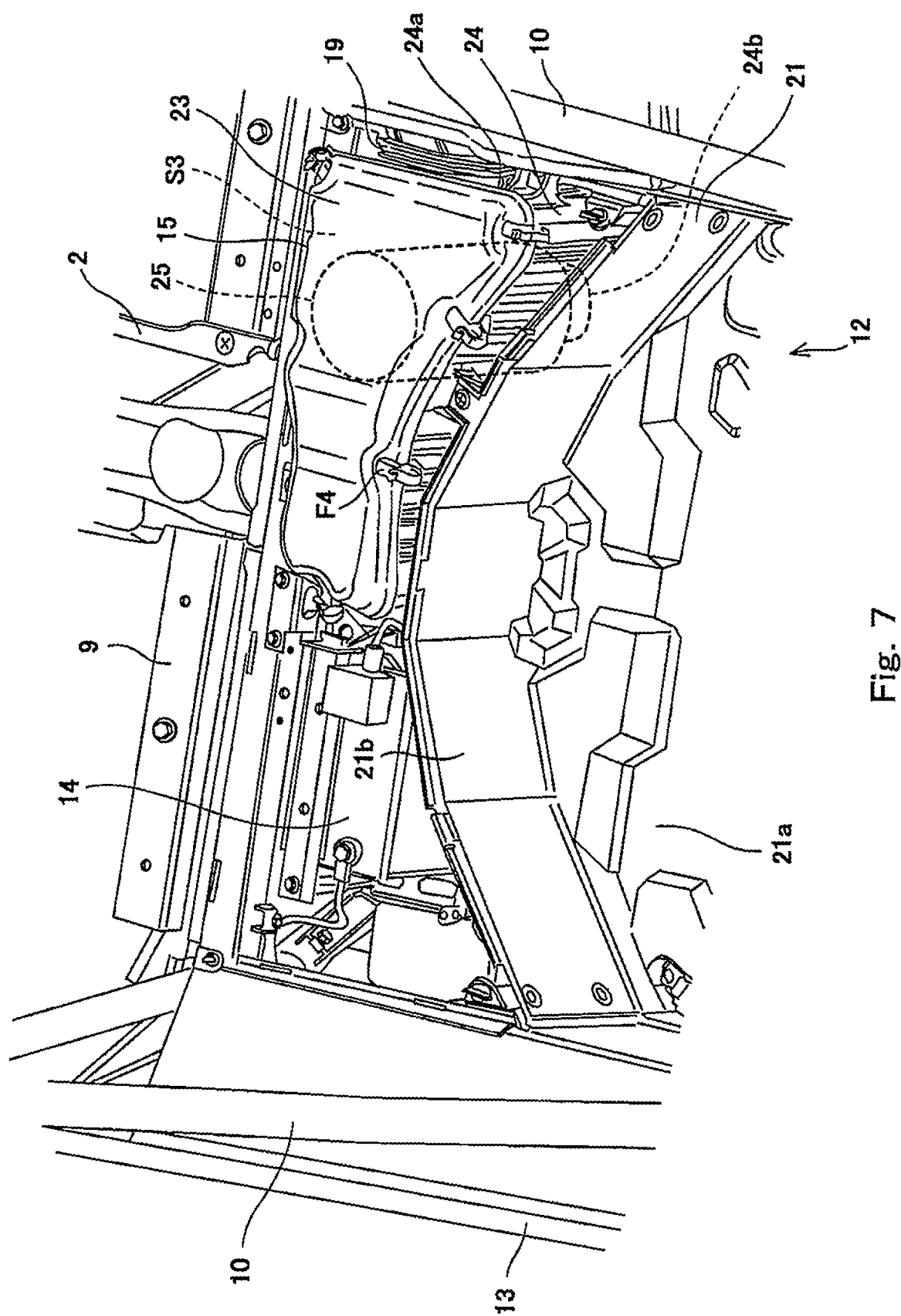
FIG. 7 is a perspective view showing a state in which a front carrier part is detached from a main carrier part, in the vehicle of FIG. 1.

FIG. 7 is a perspective view showing a state in which the front carrier part 22 is detached from the main carrier part 21, in the vehicle 1 of FIG. 1. As shown in FIG. 7, the rear surface of the air cleaner box 15 has a shape (substantially circular-arc shape in Embodiment 2) conforming to that of the front wall portion 21b of the main carrier part 21. The air cleaner box 15 further includes a second filter member (filter member of the air cleaner box 15) 25. An air discharge port 24b is provided in the bottom portion of the lower case 24 to discharge therethrough the air which has flowed through the air cleaner box 15.

The second filter member 25 is accommodated in the inner space S3 of the air cleaner box 15. The upper case 23 and the lower case 24 extend in the vehicle width direction. This makes it possible to secure the volume of the inner space S3 of the air cleaner box 15. The second filter member 25 has a cylindrical shape. The second filter member 25 is disposed in the inner space S3 so that the air discharge port 24b is located inward of the periphery of the lower end of the second filter member 25 in a state in which the axial direction of the second filter member 25 corresponds with the vertical direction. The second filter member 25 filters the air supplied to the air cleaner box 15. After that, the air is discharged to an outside region of the air cleaner box 15 through the air discharge port 24b.

The upper case 23 is detachably fastened to the lower case 24 by use of a plurality of fastening members F4 (e.g., spring clips) arranged apart from each other in the periphery of the upper case 23, in a state in which the upper case 23 is in contact with the upper end of the second filter member 25 and the lower case 24 is in contact with the lower end of the second filter member 25. In this configuration, the second filter member 25 can be taken out of the inner space S3 in a substantially vertical direction (in an upward direction in Embodiment 1), in a state in which the front carrier part 22 is detached from the main carrier part 21 so that the upper part of the air cleaner box 15 is exposed, and the upper case 23 is detached (disengaged) from the lower case 24.

In the above-described configuration, by detaching the front carrier part 22 from the main carrier part 21, maintenance work for the air cleaner box 15 can be efficiently performed. In the present embodiment, by detaching the front carrier part 22 from the main carrier part 21, the upper part of the battery 14 is exposed. Therefore, maintenance work for the battery 14 and a work for connecting accessory components to the terminals of the battery 14 can also be efficiently performed.

In the present embodiment, the front carrier part 22 is entirely removably mounted on the main carrier part 21. Alternatively, for example, in a case where it is not necessary to frequently access the battery 14 from above, a portion of the front carrier part 22, the portion being right (just) above the air cleaner box 15, may have a structure capable of being opened and closed in the substantially vertical direction, and the front carrier part 22 may be secured to the main carrier part 21.

Figure 8:
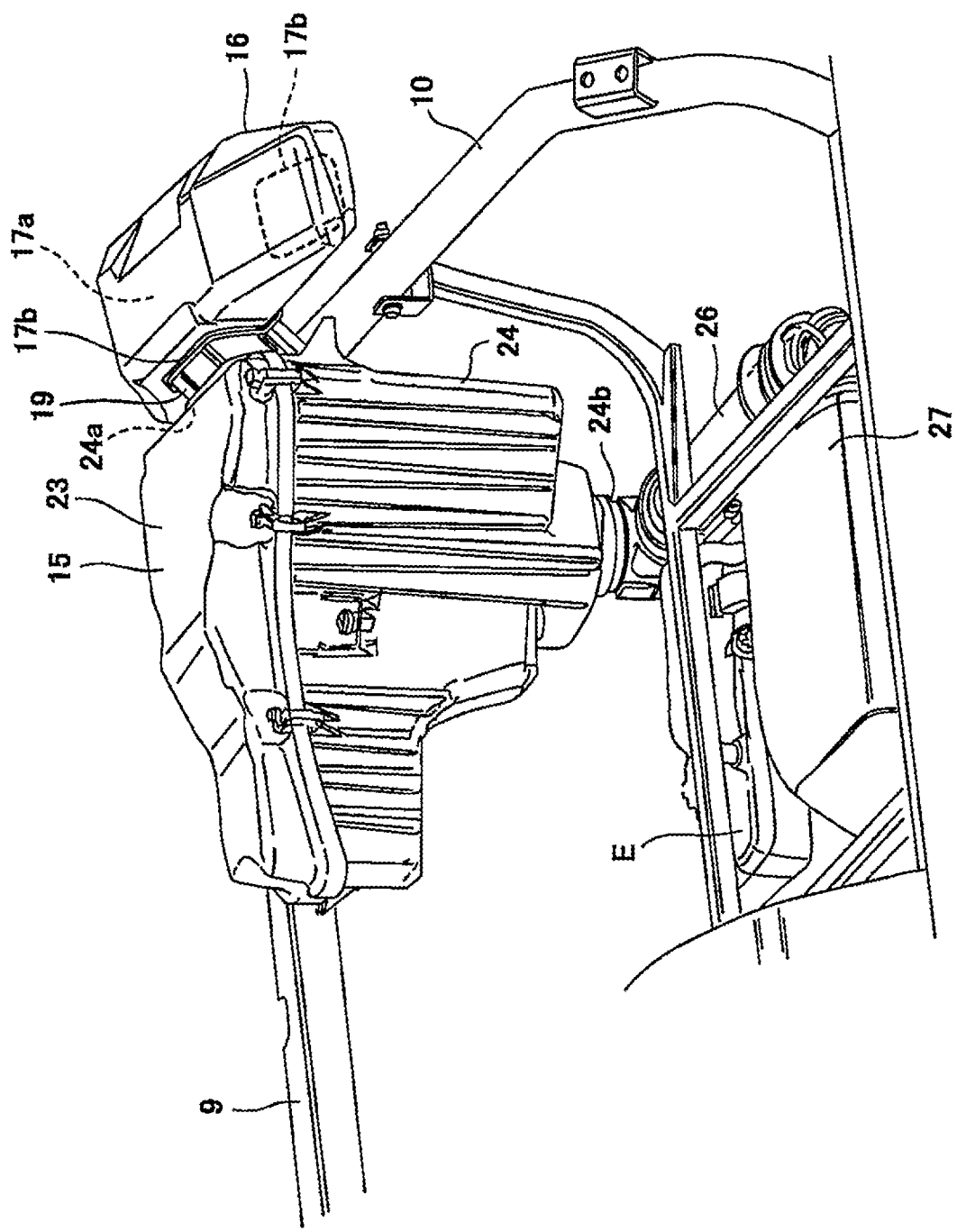
FIG. 8 is a perspective view showing an air-intake unit, an air cleaner box, a supply pipe, an air-intake chamber, and an engine, of the vehicle of FIG. 1.

FIG. 8 is a perspective view showing the air-intake unit 16, the air cleaner box 15, an air-intake chamber 27, a supply pipe 26, and the engine E, of the vehicle 1 of FIG. 1. As shown in FIG. 8, the vehicle 1 further includes the supply pipe 26, and the air-intake chamber 27.

After the air has flowed through the air cleaner box 15, the air flows to the air-intake chamber 27. Then, the air is supplied from the air-intake chamber 27 to the engine E. The air-intake chamber 27 is disposed rearward of the engine E, and mounted on a gear box (not shown) connected to the CVT TM, by a bracket.

The supply pipe 26 is connected to an exit (air discharge port 24b) of the air cleaner box 15 and an entrance of the air-intake chamber 27, to supply the intake-air flowing from the air cleaner box 15 (the intake-air which has flowed through the air cleaner box 15) to the air-intake chamber 27. The supply pipe 26 extends in the forward and rearward direction at a location on a lateral side (right side in Embodiment 1) of the air-intake chamber 27 and is configured to supply the air to the air-intake chamber 27 from the first side in the vehicle width direction. In the present embodiment, the supply pipe 26 is removably connected to the exit of the air cleaner box 15 and the entrance of the air-intake chamber 27.

The supply pipe 26 is inclined upward (extends with an upward slope) from the exit of the air cleaner box 15 toward the entrance of the air-intake chamber 27. In this configuration, even in a case where foreign matters are mixed into the intake-air flowing from the exit of the air cleaner box 15 toward the entrance of the air-intake chamber 27, ingress of the foreign matters into the air-intake chamber 27 can be prevented.

In the vehicle 1, in a state in which the air-intake unit 16, the air cleaner box 15, and the air-intake chamber 27 are disposed so that they are spaced apart from each other, the air-intake unit 16 and the air cleaner box 15 are connected to each other via the connection member 19, and the air cleaner box 15 and the air-intake chamber 27 are connected to each other via the supply pipe 26. In this layout, the air-intake unit 16, the air cleaner box 15, and the air-intake chamber 27 are efficiently disposed in a limited space of the vehicle 1.

As described above, in accordance with the vehicle 1, the air inlet 17b through which the air is introduced into the air-intake passage 17a of the air-intake unit 16 is disposed to face the surface of the cargo carrier 12. In this layout, the air inlet 17b is protected by the surface of the cargo carrier 12. Therefore, for example, while the vehicle 1 is traveling off-road, ingress of the foreign matters into the air-intake passage 17a through the air inlet 17b can be effectively prevented. Since the air inlet 17b is directed downward, it becomes possible to prevent a situation in which rain water or muddy water falling from above the air-intake unit 16 flows into the air-intake passage 17a through the air inlet 17b.

Since the air inlet 17b is located below the upper end of the rear fender 13, it becomes possible to effectively prevent a situation in which foreign matters such as sand or mud whirled by the rear wheel 4 or the like, from below the rear fender 13 enter the air-intake passage 17a through the air inlet 17b, while the vehicle 1 is traveling.

Since the air-intake unit 16 is disposed at the cargo carrier 12 at a location that is on the first side in the vehicle width direction, ingress of foreign matters into the air-intake passage 17a through the air inlet 17b can be prevented while avoiding a situation in which the air-intake unit 16 interferes with stuff (e.g., spare tire) being loaded into the loading space S2.

The cargo carrier 12 includes the bottom surface 12a, the side surfaces 12c, and the shoulder surfaces 12d, and the air-inlet 17b faces the shoulder surface 12d from above. In this configuration, since the air-inlet 17b faces the shoulder surface 12d of the cargo carrier 12 from above, ingress of foreign matters into the air-intake passage 17a through the air inlet 17b can be prevented while allowing the stuff to be properly loaded into the loading space S2.

Each of the shoulder surfaces 12d of the cargo carrier 12 is disposed below the upper end of the corresponding one of the rear fenders 13, and the cargo carrier 12 is connected to the rear fenders 13 so that the surface of the cargo carrier 12 is continuous with the surfaces of the rear fenders 13. In this configuration, it becomes possible to effectively prevent a situation in which foreign matters such as sand or mud whirled by the rear wheel 4 or the like, from below the rear fender 13 enter the air-intake passage 17a through the air inlet 17b of the air-intake unit 16 which is disposed to face the shoulder surface 12d of the cargo carrier 12, while the vehicle 1 is traveling.

Since the air-intake unit 16 is connected to the air cleaner box 15 via the through-hole 12h of the front carrier part 22, the air-intake unit 16 and the air cleaner box 15 can be disposed more flexibly, while protecting the air cleaner box 15 by the front carrier part 22.

The cargo carrier 12 and the air cleaner box 15 are disposed rearward of the riding space S1. In this layout, the air cleaner box 15 can be efficiently disposed in the space located rearward of the riding space S1 while securing the loading space S2 and preventing ingress of the foreign matters into the air-intake passage 17a through the air inlet 17b.

The air-intake unit 16 is removably connected to the air cleaner box 15 so manner that the air-intake passage 17a is in communication with the inner space S3 of the air cleaner box 15. In this configuration, even in a case where the foreign matters enter the air-intake passage 17a, the air-intake unit 16 can be detached from the air cleaner box 15 and a maintenance work for the air-intake unit 16 can be efficiently performed.

The air-intake unit 16 includes the hollow member 17, and the first filter member 18 removably fastened to the hollow member 17. In this configuration, a maintenance work for the air-intake unit 16 can be efficiently performed by detaching from the hollow member 17 the first filter member 18 removably mounted on the hollow member 17.

In the cargo carrier 12 of the vehicle 1, the front wall portion 21b of the main carrier part 21 and the rear wall portion 22b of the front carrier part 22 have a shape in which they protrude forward as a whole. Because of this shape, the battery 14 and the air cleaner box 15 are disposed rearward of the riding space S1, the air-intake unit 16 is disposed in such a manner that the air inlet 17b faces the surface of the cargo carrier 12, and a spare tire or the like can be easily loaded in the loading space S2. Thus, high space efficiency can be achieved in the vehicle 1. Hereinbelow, regarding Embodiment 2, differences from Embodiment 1 will be mainly described.

Embodiment 2

Figure 9:
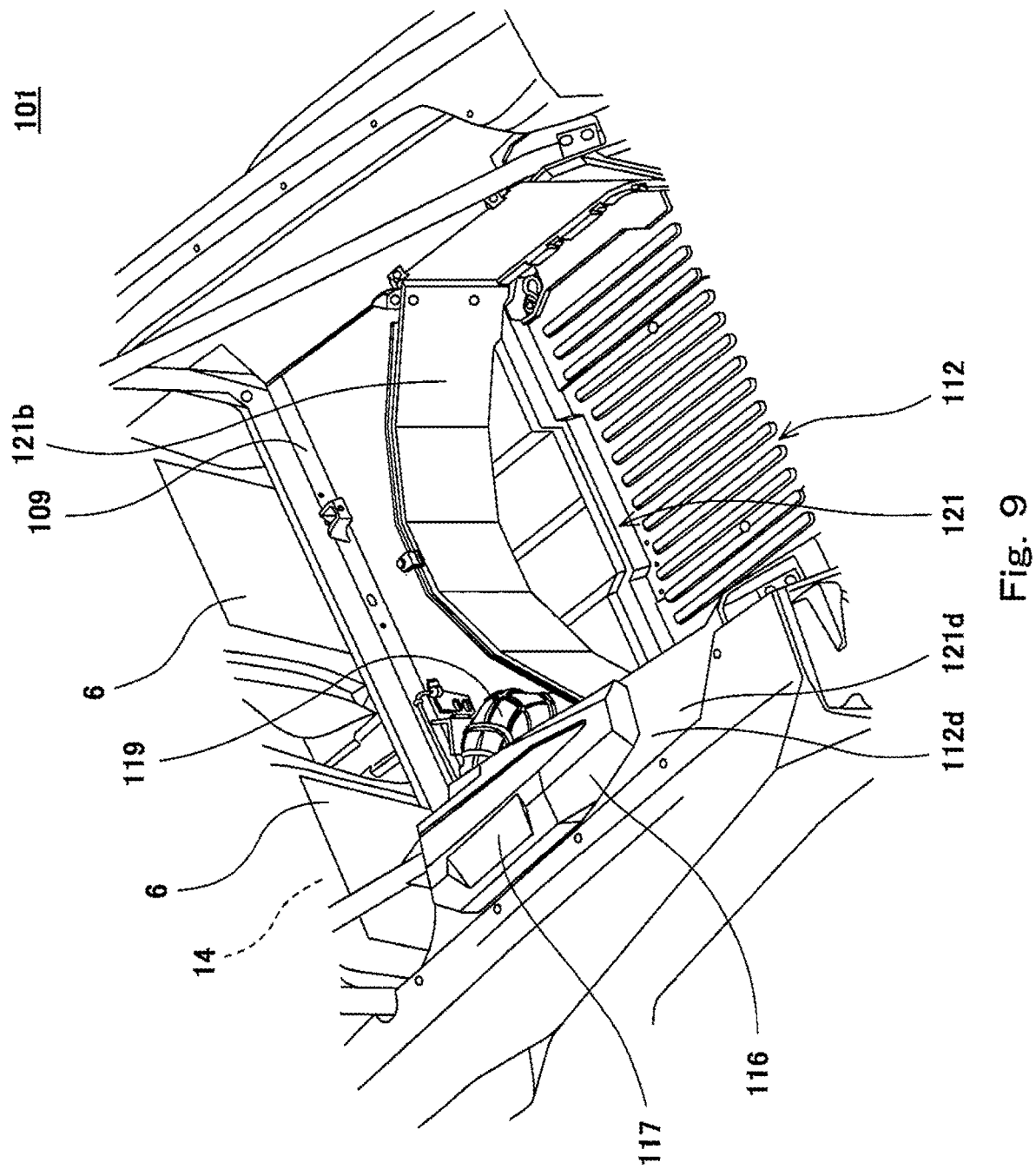
FIG. 9 is a perspective view showing the rear portion of a side-by-side vehicle (vehicle) according to Embodiment 2.
Figure 10:
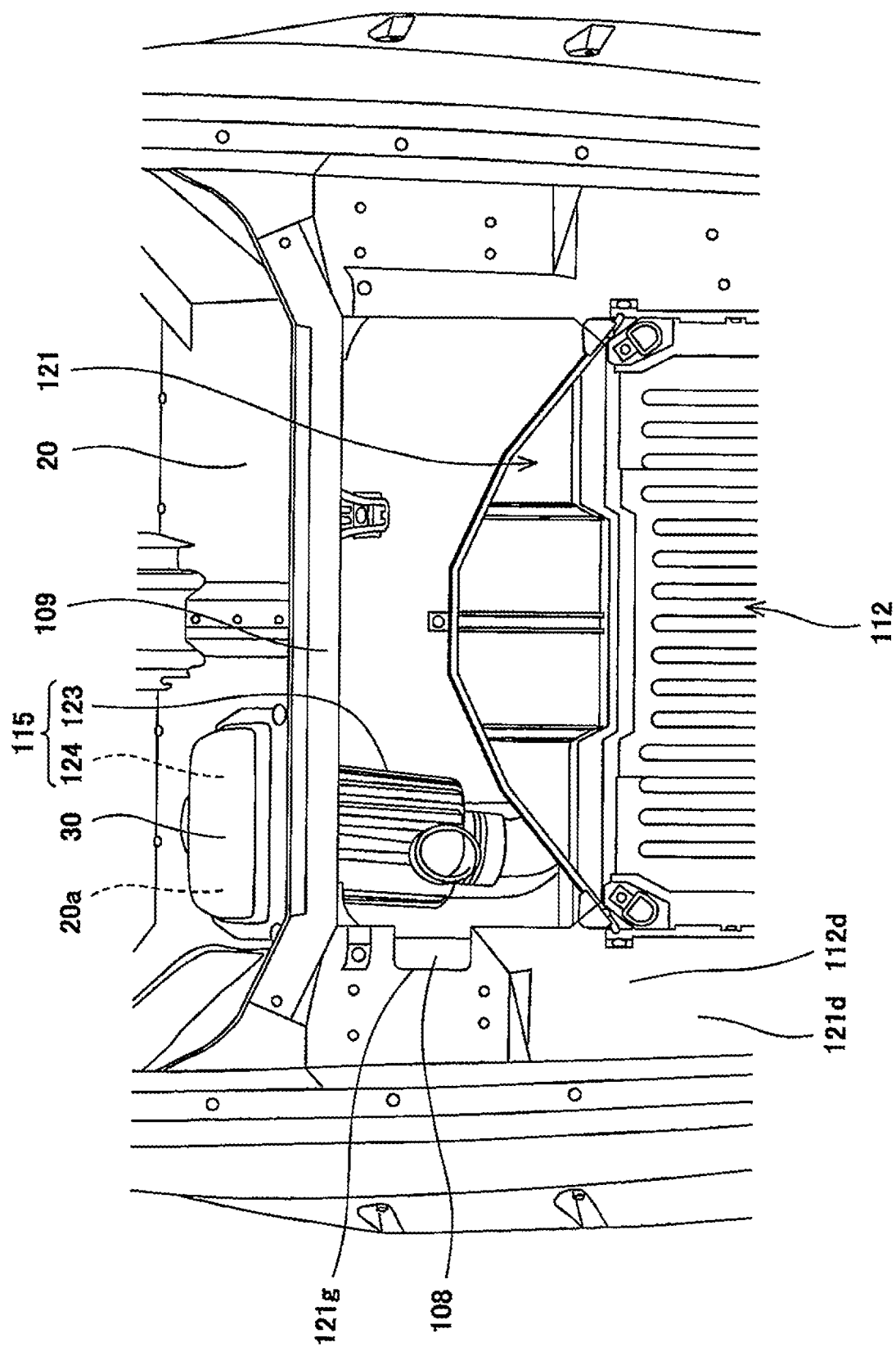
FIG. 10 is a top plan view showing a cargo carrier of FIG. 9.
Figure 11:
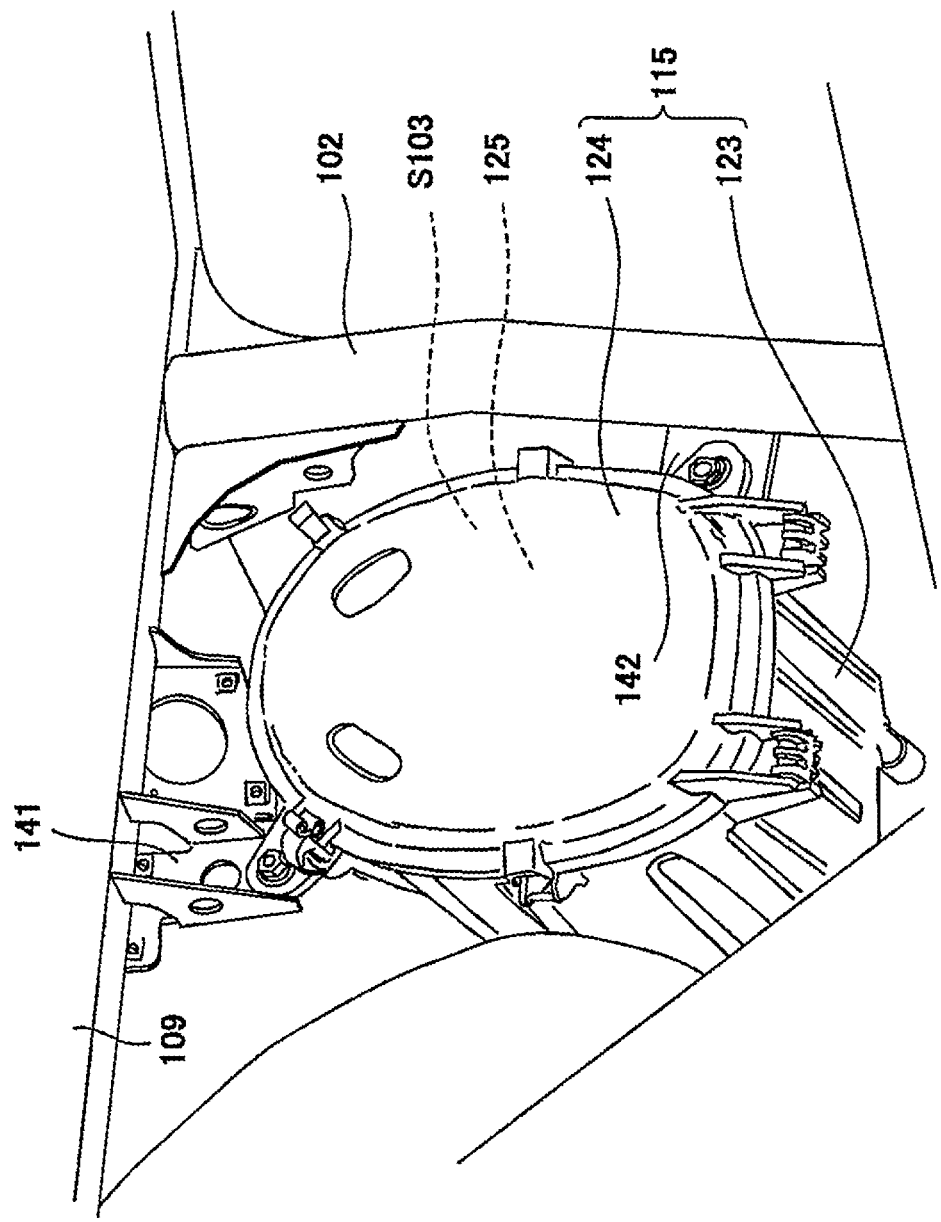
FIG. 11 is a perspective view showing an air cleaner box of FIG. 9, when viewed from the front.
Figure 12:
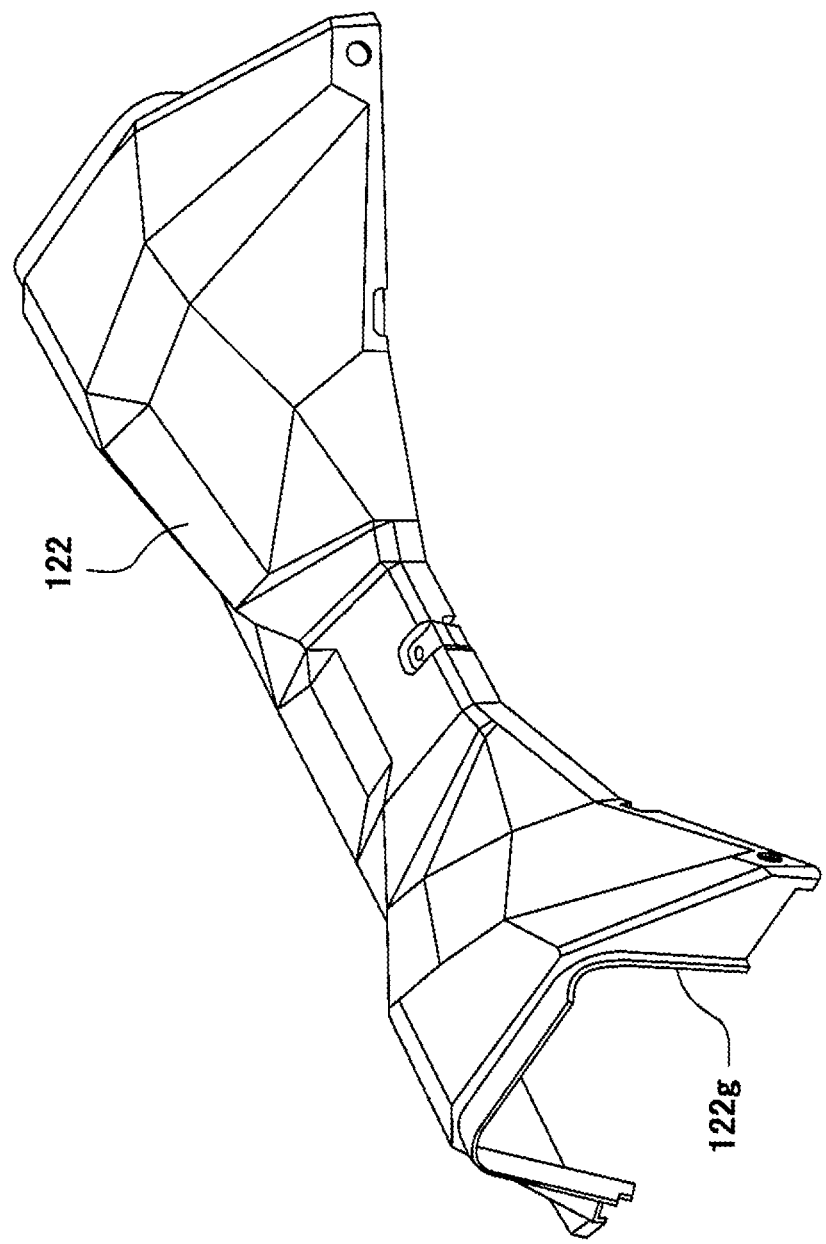
FIG. 12 is a perspective view showing a front carrier part included in the side-by-side vehicle of FIG. 9.
Figure 13:
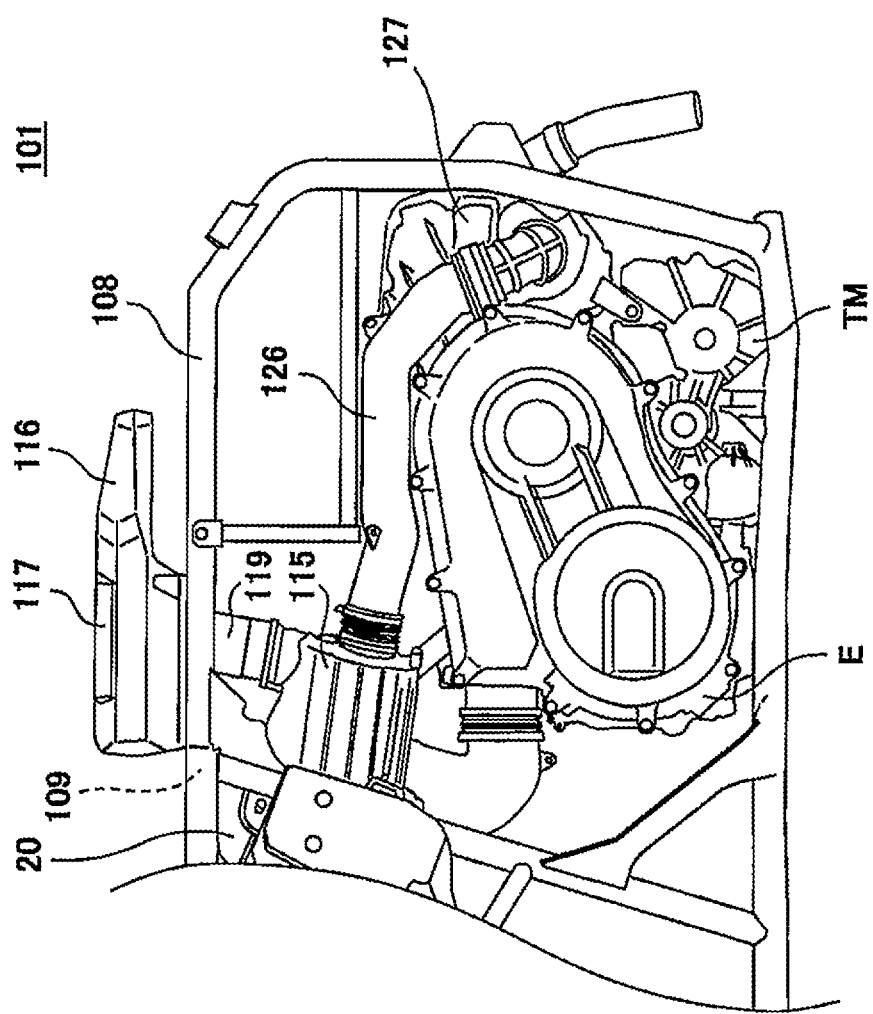
FIG. 13 is a left side view showing an engine of the side-by-side vehicle of FIG. 9.
Figure 14:
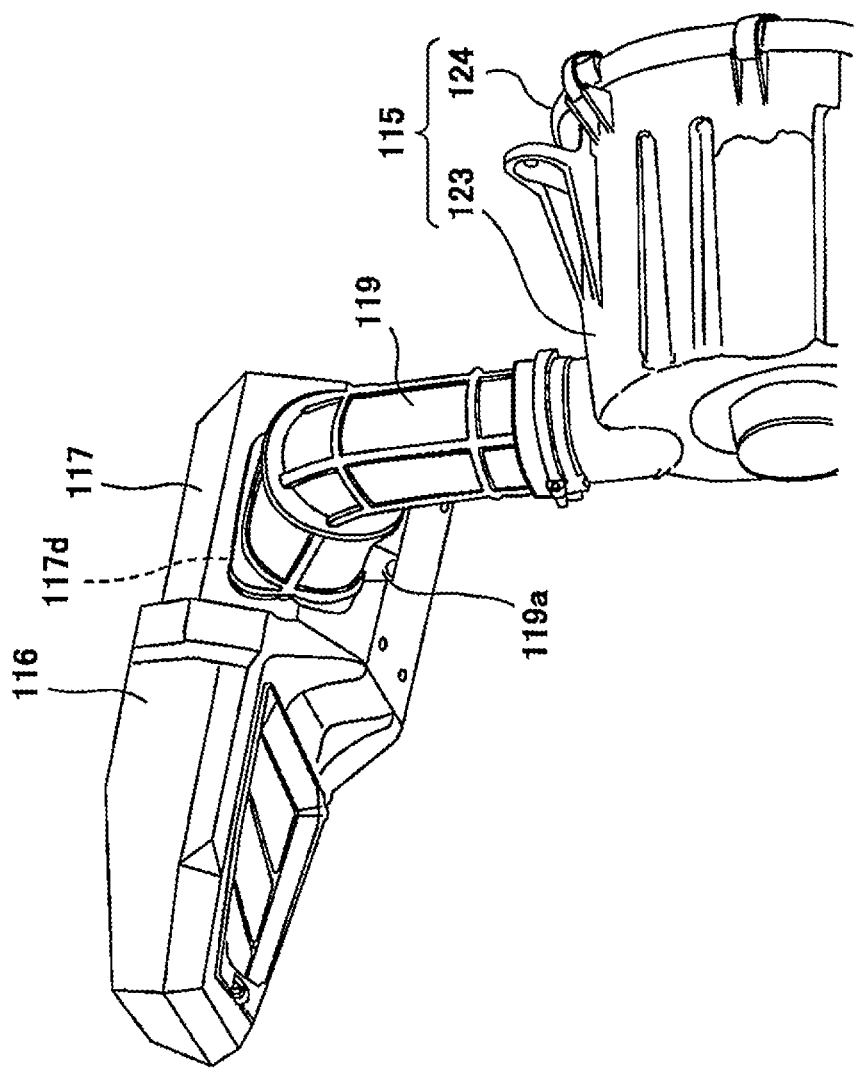
FIG. 14 is a perspective view showing a connection member and an air-intake unit of FIG. 9.

FIG. 9 is a perspective view showing the rear portion of a side-by-side vehicle (vehicle) 101 according to Embodiment 2. FIG. 10 is a top plan view showing a cargo carrier 112 of FIG. 9. FIG. 10 shows a state in which a front carrier part 122 and an air-intake unit 116 are detached. FIG. 11 is a perspective view showing an air cleaner box 115 of FIG. 9, when viewed from the front. FIG. 12 is a perspective view showing the front carrier part 122 included in the vehicle 101 of FIG. 9. FIG. 13 is a left side view showing an engine E of the vehicle 101 of FIG. 9. FIG. 14 is a perspective view showing a connection member 119 and the air-intake unit 116 of FIG. 9.

As shown in FIGS. 9 to 13, the air-intake unit 116 of the vehicle 101 is disposed on the left side of the vehicle 101 and is exposed. The air-intake unit 116 includes a hollow member 117. A connection hole 117d is formed in the inner side surface (right side surface in Embodiment 2) in the vehicle width direction, of the hollow member 117. The connection member 119 is connected to the connection hole 117d. The air-intake unit 116 is connected to the air cleaner box 115 via the connection member 119. The connection member 119 has a tubular shape and extends in a substantially vertical direction. The connection member 119 is disposed at a location where the connection member 119 partially overlaps with a front wall portion 121b of a main carrier part 121 in the forward and rearward direction.

As shown in FIG. 12, in the vehicle 101, an opening 122g is formed in one end in the vehicle width direction, of the front carrier part 122. The connection member 119 is insertable into the opening 122g. In a state in which the front carrier part 122 is mounted on the vehicle 101, the upstream portion of the connection member 119 is exposed through the opening 122g.

As shown in FIGS. 10 and 14, in the vehicle 101, the upstream end portion of the connection member 119 is provided with a protruding portion 119a protruding downward, and a shoulder wall portion 121d of the main carrier part 121 is provided with a hollow space 121g at a location corresponding to the protruding portion 119a. The connection member 119 is disposed so that the protruding portion 119a is located within the hollow space 121g.

The tip end in a protruding direction, of the protruding portion 119a contacts the rear frame part 108, and thus the connection member 119 is supported by the rear frame part 108. In a state in which the lower surface of the hollow member 117 is in contact with a shoulder surface 112d of the shoulder wall portion 121d, the hollow member 117 is fastened to the shoulder wall portion 121d by use of a plurality of fastening members.

As shown in FIG. 9, in the vehicle 101, the battery 14 is disposed under the seat 6. As shown in FIG. 10, the air cleaner box 115 is disposed under a cross frame part 109 at a location that is on the second side (left side in Embodiment 2) in the vehicle width direction. By detaching (dismounting) the front carrier part 122, the side portion of the air cleaner box 115 and the downstream portion of the connection member 119 are exposed.

As shown in FIGS. 10 and 11, the vehicle 101 includes a back panel 20 which defines the width of a region rearward of the riding space. The back panel 20 includes an opening 20a through which the front portion of the air cleaner box 115 can be exposed, and a cover member 30 which is detachably mountable on the opening 20a.

The air cleaner box 115 includes a first case 123, a second case 124, and a filter member (filter member of air cleaner box) 125. The first case 123 and the second case 124 are joined to each other to form an inner space S103. The filter member 125 is accommodated in the inner space S of the air cleaner box 115.

For example, the first case 123 has a tubular shape with a bottom, while the second case 124 has a lid shape for closing the opening of the first case 123. The first case 123 is disposed so that its axial direction corresponds with the forward and rearward direction. The second case 124 is coupled to the periphery of the opening of the first case 123 so that the opening of the first case 123 can be opened and closed. The side portion of the first case 123 is fastened to the cross frame part 109 and a portion of the vehicle body frame 102 which is located below the cross frame part 109 by brackets 141, 142 and fastening members. In this way, the air cleaner box 115 is supported by the vehicle body frame 102.

In a state in which the cover member 30 of the back panel 20 is detached, and thereby the inner space S103 is opened in the forward direction, the filter member 125 can be taken out of the inner space S103 in the forward direction (to be precise, forward in the axial direction of the first case 123).

As shown in FIG. 13, the vehicle 101 includes an air-intake chamber 127, and a supply pipe 126 which is connected to the exit of the air cleaner box 115 and the entrance of the air-intake chamber 127, and supplies to the air-intake chamber 127 the intake-air flowing from the air cleaner box 115 (the intake-air which has flowed through the air cleaner box 115). The air-intake chamber 127 is connected to the CVT TM by a bracket. The supply pipe 126 is bent in the downward direction and then bent in the upward direction, from the exit of the air cleaner box 115 toward the entrance of the air-intake chamber 127.

In Embodiment 2, the same advantages as those of Embodiment 1 can be obtained. In addition, in a state in which the cover member 30 of the back panel 20 is detached and the second case 124 is moved away from the first case 123, the filter member 125 can be taken out of the inner space S103 in the forward direction. This allows an operator to relatively easily perform maintenance for the air cleaner box 115.

Since the supply pipe 126 is bent in the downward direction and then bent in the upward direction, from the exit of the air cleaner box 115 toward the entrance of the air-intake chamber 127, ingress of the foreign matters into the air-intake chamber 127 can be prevented even in a case where the foreign matters are mixed into the intake-air flowing from the exit of the air cleaner box 115 toward the entrance of the air-intake chamber 127.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention. For example, although the air-intake unit 16 is disposed to face the shoulder surface 12d of the cargo carrier 12, it may be disposed to face the bottom surface 12a of the cargo carrier 12.

The invention claimed is:

1. A side-by-side vehicle comprising:
    a vehicle body frame including a cabin frame part surrounding a riding space in which seats for a driver and a passenger are provided;
    an engine which is mounted on the vehicle body frame and generates driving power for allowing the side-by-side vehicle to travel;
    an air-intake unit including in an inside thereof, an air-intake passage through which intake-air flows to the engine, and an air inlet through which the intake-air is introduced into the air-intake passage; and
    a cargo carrier having a loading space with a depressed shape in a state in which the cargo carrier is supported by the vehicle body frame,
    wherein the air-intake unit is disposed so that the air inlet is directed downward and faces an upwardly facing surface of the cargo carrier.

2. The side-by-side vehicle according to claim 1, further comprising:
    a rear wheel; and a rear fender disposed above the rear wheel in a state in which the rear fender is supported by the vehicle body frame, wherein the air inlet of the air-intake unit is disposed below an upper end of the rear fender.

3. The side-by-side vehicle according to claim 1, wherein the air-intake unit is disposed on the cargo carrier at a location that is on a first side in a vehicle width direction.

4. A side-by-side vehicle comprising:

a vehicle body frame including a cabin frame part surrounding a riding space in which seats for a driver and a passenger are provided;

an engine which is mounted on the vehicle body frame and generates driving power for allowing the side-by-side vehicle to travel;

an air-intake unit including in an inside thereof, an air-intake passage through which intake-air flows to the engine, and an air inlet through which the intake-air is introduced into the air-intake passage; and a cargo carrier having a loading space with a depressed shape in a state in which the cargo carrier is supported by the vehicle body frame, wherein the air-intake unit is disposed so that the air inlet is directed downward and faces a surface of the cargo carrier, wherein the cargo carrier includes a bottom surface of the loading space, a side surface protruding upward from a side end of the bottom surface, and a shoulder surface protruding outward in a vehicle width direction, from an upper end of the side surface, and wherein the air inlet of the air-intake unit faces the shoulder surface from above.

5. The side-by-side vehicle according to claim 4, further comprising:

a rear wheel; and a rear fender disposed above the rear wheel in a state in which the rear fender is supported by the vehicle body frame, wherein the shoulder surface of the cargo carrier is disposed below an upper end of the rear fender, wherein the cargo carrier further includes an extension surface extending from an outer side of the shoulder surface in the vehicle width direction toward the upper end of the rear fender, and wherein the cargo carrier is connected to the rear fender so that the surface of the cargo carrier is continuous with a surface of the rear fender.

6. The side-by-side vehicle according to claim 4, further comprising:

an air cleaner box disposed in front of the bottom surface of the cargo carrier, the air cleaner box being configured to filter the intake-air flowing from the air-intake passage of the air-intake unit and supply the filtered intake-air to the engine, in a state in which the air cleaner box is supported by the vehicle body frame, wherein the cargo carrier includes a main carrier part, and a front carrier part covering the air cleaner box, wherein the main carrier part includes the bottom surface, the side surface, and the shoulder surface, wherein the front carrier part includes an upper surface located above the air cleaner box at a location higher than the bottom surface of the main carrier part, and a side surface located in a portion of the upper surface which is closer to the air-intake unit, wherein the side surface of the front carrier part is formed with a through-hole, and wherein the air-intake unit is connected to the air cleaner box via the through-hole.

7. The side-by-side vehicle according to claim 6, wherein the cargo carrier and the air cleaner box are disposed rearward of the riding space.

8. The side-by-side vehicle according to claim 6, wherein the front carrier part is disposed so that an upper part of the air cleaner box can be exposed in a state in which the front carrier part is detached from the main carrier part, wherein the air cleaner box includes an upper case, a lower case, and a filter member of the air cleaner box, the upper case and the lower case are joined to each other to form an inner space, and the filter member of the air cleaner box is accommodated in the inner space of the air cleaner box, and wherein the filter member of the air cleaner box is disposed to be capable of being taken out of the inner space in a substantially vertical direction, in a state in which the upper part of the air cleaner box is exposed by detaching the front carrier part from the main carrier part, and the upper case is detached from the lower case.

9. The side-by-side vehicle according to claim 6, further comprising:

a back panel which defines a width of a region rearward of the riding space, wherein the back panel includes an opening through which a front portion of the air cleaner box can be exposed, and a cover member which is detachably mountable on the opening, wherein the air cleaner box includes a first case, a second case, and a filter member of the air cleaner box, the first case and the second case are joined to each other to form an inner space, and the filter member of the air cleaner box is accommodated in the inner space of the air cleaner box, and wherein in a state in which the cover member of the back panel is detached, and the inner space is opened in a forward direction, the filter member of the air cleaner box can be taken out of the inner space in the forward direction.

10. The side-by-side vehicle according to claim 6, wherein the air-intake unit is detachably connected to the air cleaner box so that the air-intake passage is in communication with an inner space of the air cleaner box.

11. A side-by-side vehicle comprising:

a vehicle body frame including a cabin frame part surrounding a riding space in which seats for a driver and a passenger are provided;

an engine which is mounted on the vehicle body frame and generates driving power for allowing the side-by-side vehicle to travel;

an air-intake unit including in an inside thereof, an air-intake passage through which intake-air flows to the engine, and an air inlet through which the intake-air is introduced into the air-intake passage; and a cargo carrier having a loading space with a depressed shape in a state in which the cargo carrier is supported by the vehicle body frame, wherein the air-intake unit is disposed so that the air inlet is directed downward and faces a surface of the cargo carrier, and wherein the air-intake unit includes a hollow member provided with the air-intake passage and the air inlet, and a filter member removably fastened to the hollow member, the filter member of the air-intake unit being disposed to be capable of filtering the intake-air flowing through the air-intake passage.

12. The side-by-side vehicle according to claim 6, further comprising:
an air-intake chamber which supplies to the engine the intake-air flowing from the air cleaner box; and
a supply pipe connected to an exit of the air cleaner box and an entrance of the air-intake chamber and configured to supply to the air-intake chamber the intake-air flowing from the air cleaner box,
wherein the supply pipe extends with an upward slope from the exit of the air cleaner box toward the entrance of the air-intake chamber.

13. The side-by-side vehicle according to claim 6, further comprising:
an air-intake chamber which supplies to the engine the intake-air flowing from the air cleaner box; and
a supply pipe connected to an exit of the air cleaner box and an entrance of the air-intake chamber and configured to supply to the air-intake chamber the intake-air flowing from the air cleaner box,
wherein the supply pipe is bent in a downward direction and then bent in an upward direction, from the exit of the air cleaner box toward the entrance of the air-intake chamber.

14. The side-by-side vehicle according to claim 1, further comprising an air cleaner box,
wherein the air-intake unit is attachable to and detachable from the air cleaner box.

15. The side-by-side vehicle according to claim 1, wherein the air-intake unit is exposed outside the side-by-side vehicle.

16. The side-by-side vehicle according to claim 1, wherein the air-intake unit is detachable upward from a body of the vehicle.

17. The side-by-side vehicle according to claim 1, further comprising an air cleaner box connected to the air-intake unit,
wherein the cargo carrier and the air cleaner box are disposed rearward of the riding space.

18. The side-by-side vehicle according to claim 1, wherein the upwardly facing surface is a bottom surface of the loading space of the cargo carrier.

19. The side-by-side vehicle according to claim 1, further comprising a barrier located outward of the air-intake unit in a vehicle width direction and extending in a vehicle height direction.

\* \* \* \* \*